United States Patent [19]

Brown et al.

[11] Patent Number: 5,006,297
[45] Date of Patent: Apr. 9, 1991

[54] METHOD OF MOLDING POLYURETHANE COVERED GOLF BALLS

[75] Inventors: Robert A. Brown, Mattapoisett; Shenshen Wu, No. Dartmouth, both of Mass.

[73] Assignee: Acushnet Company, New Bedford, Mass.

[21] Appl. No.: 314,466

[22] Filed: Feb. 22, 1989

[51] Int. Cl.⁵ ............ B29C 35/02; B29C 39/10; B29C 43/18
[52] U.S. Cl. .................. 264/234; 264/236; 264/254; 264/255; 264/275; 264/278; 273/DIG. 8
[58] Field of Search ........... 264/254, 255, 234, 236, 264/275, 278; 273/235 R, DIG. 8

[56] References Cited

U.S. PATENT DOCUMENTS

| | | | |
|---|---|---|---|
| 3,034,791 | 5/1962 | Gallagher | 273/235 |
| 3,130,102 | 4/1964 | Watson et al. | 156/228 |
| 3,147,324 | 9/1964 | Ward | 264/254 |
| 3,177,280 | 4/1965 | Ford et al. | 264/275 |
| 3,233,036 | 2/1966 | Jachimowicz | 174/107 |
| 3,979,126 | 9/1976 | Dusbiber | 273/218 |
| 3,989,568 | 11/1976 | Isaac | 156/182 |
| 4,123,061 | 10/1978 | Dusbiber | 273/220 |

FOREIGN PATENT DOCUMENTS

| | | |
|---|---|---|
| 260816 | 10/1963 | Australia. |
| 653570 | 12/1962 | Canada. |
| 997663 | 7/1965 | United Kingdom. |
| 1321269 | 6/1973 | United Kingdom. |
| 1321270 | 6/1973 | United Kingdom. |

Primary Examiner—James Lowe
Attorney, Agent, or Firm—Lucas & Just

[57] ABSTRACT

A polyurethane covered golf ball is made by allowing the polyurethane cover stock material to partially cure in an open mold and subsequently molding a golf ball product. The molding is done by first molding a smooth-surfaced golf ball product in a smooth-walled fixed-pin mold and then, in a second molding step, using a compression mold to impart dimples onto the smooth-surfaced golf ball product. Between the two molding steps an intermediate curing step is employed. The initial curing time is an open mold and the intermediate curing time between the two molding steps is minimized through the use of a sufficient amount of catalyst, by keeping the smooth mold at an elevated temperature, or by using the fast-reacting chemical components.

21 Claims, 2 Drawing Sheets

METHOD OF MOLDING POLYURETHANE COVERED GOLF BALLS

BACKGROUND OF THE INVENTION

1. Field of Invention

This invention relates to golf balls and, more particularly, to golf balls having covers made of polyurethane.

2. Discussion of Prior Art

Conventionally, golf ball covers are formed about cores in a one-step molding process by either compression molding or injection molding in which cover stock is molded about a core. The core is either wound or solid. Solid cores are generally made from a homogeneous mass of material, while wound cores are made by winding elastic thread about a center. The center is typically either a small balloon filled with liquid or a solid mass of material.

In compression molding, a core is placed between two relatively smooth, preformed half-shells made from a cover stock and then placed into a compression mold. A compression mold generally comprises two mold plates, each of which houses a plurality of mold cups. Each mold cup has a negative dimple pattern which is embossed into the cover half-shells by closing the mold and subjecting the core and cover stock to heat and pressure. The heat and pressure cause the preformed cover half-shells to soften and flow about the core to pick up the dimple pattern of the mold cups.

With injection molding, cores are placed in a mold in which the mold cups are typically equipped with retractable pins. The pins ensure correct positioning of the core in the cup. Once the core is correctly positioned in the closed mold, cover stock is injected into the mold cups and flows about the core. The cover stock picks up the dimple pattern of the mold cups. Once the mold cups are filled with cover stock, the pins are retracted while the cover stock is still at least semi-flowable, allowing the cover stock to close the pinholes. Retractable-pin molds are expensive, difficult to operate, often result in surface defects, and limit the number of compositions which can be used as cover stock.

There are only a few materials which are considered suitable for golf ball covers. Balata, a naturally occurring material which can also be made synthetically, was the material of choice until the mid-1960's. Balata was known for its great "click" and "feel" but was also known to "cut like butter." In the 1960's, E. I. du Pont de Nemours & Company came out with a new plastic product, an ionomer which was sold under the name SURLYN. SURLYN resin was soon tried on golf balls and, because of its great toughness, won an increasing share of the market to the point that, as of 1988, it has been used in more than 90% of all golf balls sold. While SURLYN has been a remarkable success as a golf ball cover material, it is hard as compared to balata and many golfers continue to prefer balata because of its "click" and "feel." SURLYN ® is a trademark for a group of ionomer resins which are generally copolymers of an olefin and an alpha, beta ethylenically unsaturated carboxylic acid with 10–90% of the carboxylic acid groups neutralized by metal ions.

The search has continued for a golf ball cover material with the durability of SURLYN and the "click" and "feel" of balata. Polyurethanes have been considered periodically for quite a few years because they meet the requirements of both durability and good "click" and "feel"; the big disadvantage to polyurethanes, however, has been processability. While golf ball covers can be formed from polyurethanes, and, indeed, there is considerable patent literature in this area (see, for example, U.S. Pat. No. 3,989,568), commercial processability has continued to be a substantial problem.

Polyurethanes are the result of a reaction between a prepolymer and a polyfunctional curing agent, notably a polyamine or a polyol. The prepolymer is made from a polyether or a polyester with a diisocyanate, polyethers being preferred because of their water resistance. Both thermoplastic and thermosetting polyurethanes are known; however, thermosets have been found to produce better cover stocks for golf balls. A thermosetting material is a polymer that "sets" irreversibly. The setting of a polyurethane is accomplished by cross-linking of the prepolymer with the polyfunctional curing agent.

U.S. Pat. No. 3,177,280, issued April 6, 1965, teaches using a two-step process for making a polyurethane covered golf ball by a first step of forming a smooth cover about a core and then a second step of overmolding a dimple pattern into the still soft, partially cured urethane cover of the smooth covered golf ball. The first step is accomplished by either transfer molding cover stock about a core in a closed mold or by using a doctor blade to coat the exterior of a cover with cover stock material. Transfer molding of cover stock into a closed mold has led to a number of surface defects which make the golf ball unacceptable. Using a doctor blade to form the cover requires equipment not readily available on the open market.

SUMMARY OF THE INVENTION

Applicants have discovered a process that provides a high-quality polyurethane cover for a golf ball. The process comprises an initial curing step in an open mold wherein urethane is introduced into both mold halves and allowed to partially cure prior to the introduction of the core followed by a molding step wherein the core is placed into one of the mold cups. The mold is then closed and the urethane is allowed to cure. Preferably, the molding step comprises an initial molding step wherein a first mold having smooth-walled fixed-pin mold cups is used followed by a final molding step wherein the smooth-surfaced golf ball product from the initial molding step is subject to a second mold having mold cups with a negative dimple pattern and which is used to overmold a dimple pattern onto the smooth-surfaced golf ball product.

Because urethanes have a relatively short pot-life and start to cure immediately upon the introduction of the curing agent, conventional thinking dictated that the mold be immediately closed once the urethane cover stock was added. It is surprising and unexpected that some degree of curing prior to the placing of the cores into the mold is essential to the formation of a good smooth ball.

It is likewise contrary to conventional thinking to introduce flowable cover stock material into both halves of a mold and then close the mold. Conventional thinking has been to use transfer molding techniques to introduce flowable cover stock material into a closed mold or to use an equivalent process, such as injection molding or compression molding.

The preliminary curing step in the process of the present invention comprises introducing into both halves of an open mold urethane cover stock material and allowing that material to partially cure. The time necessary for the partial curing will vary, depending on the exact composition of the cover stock. Applicants have found that the length of time necessary for the partial curing is about equal to the time needed for the urethane to become sufficiently adhesive between the wall of the mold cup and the core to prevent a core placed in the top mold cup from falling out of the mold cup when the top mold cup is closed into the bottom mold cup. Good results have been obtained at a time of about 1 minute. The period for the initial curing is conveniently determined between a mold cup made from stainless steel and a core.

A convenient method for determining the length of time necessary for the initial curing step is to measure the viscosity of the urethane cover stock. Applicants have found that, generally, there is about a two-fold increase in viscosity of the polyurethane. To determine the viscosity, applicants use a simple procedure of placing about 2 ml of polyurethane cover stock onto a duly polished aluminum surface which is at an angle of 30° to the horizontal. Upon initially mixing the cover stock, prepolymer plus curing agent, the cover stock travels 3 inches (7.62 cm) in about 5 seconds. At the time the initial curing step is complete, about 2 ml of the cover stock travels the 3 inches (7.62 cm) on the 30° aluminum surface in about 10 seconds.

In the initial molding step, cover stock flows about the core while pins correctly position the core inside the cover stock and a golf ball product that has substantially the size and shape of a finished golf ball is produced. While the mold can be of the retractable-pin type, it is preferred to use a mold with fixed pins, i.e. pins which are not retractable. This golf ball product of the initial molding operation is subjected to a final molding step in which heat and pressure are used to impart a dimple pattern onto the smooth-surfaced golf ball product and to close any pinholes which may exist.

Preferably, in the initial molding step a core, either wound or solid, is placed into the top half of a pin mold and the mold is closed and subjected to low pressure to maintain a seal between mold plates. The smooth-surfaced golf ball product of the initial molding step may be removed from the mold when the ball so produced is capable of being handled without readily becoming marred or deformed. The pins of the initial smooth-walled mold ensure proper positioning of the core during this initial molding step.

In the final molding step, a compression mold is used to impart a dimple pattern upon the cover of the smooth-surfaced golf ball product. In this final molding step, the smooth-surfaced golf ball product is subjected to heat and pressure such that any pinholes which are in the ball's cover are closed and such that the cover conforms to the dimple pattern of the mold halves.

It is essential that the smooth-surfaced golf ball product of the initial molding step be subjected to the final molding step at a time when the cover stock is able to conform to the dimple pattern of the mold cups in the second mold. The mold used for the initial molding step may be either a fixed-pin or a retractable-pin mold. Use of a fixed-pin mold is preferable because of the lower initial cost, lower operating and maintenance costs and ease of use. In either case, the size of the mold cups is about that of a conventional golf ball mold, i.e. nominally 1.68 inches (4.25 cm) for American sized balls and nominally 1.62 inches (4.10 cm) for British sized balls. Both the fixed-pin and retractable-pin molds are conventional.

The mold used in the final molding step is preferably a conventional compression mold in which each of the mold cups has a desired negative dimple pattern. Generally, the dimple pattern is that of concave sections of spheres; however, the word "dimple" as used herein refers to any geometric shape and includes inverted pyramids, hexagons, pentagons, brambles (see *The Curious History of the Golf Ball*, Horizon Press, 1968, pages 156–157), etc.

An intermediate curing step is preferably employed after the initial molding step but before the final molding step. The intermediate curing step allows the cover stock to cure to a point such that the cover stock is able to hold the dimple pattern of the mold halves of the compression mold after applying the heat and pressure of the final molding step. If the intermediate curing step is too short, the cover stock is unable to retain the dimple pattern from the final molding step and a poor quality golf ball produced. If the intermediate curing step is too long, the cover stock is unable to conform to the dimple pattern of the mold halves from the compression mold. The time period for the intermediate step will vary depending upon the chemical composition of the cover stock and upon the ratio of curing agent and prepolymer used in formulating the cover stock.

The length of time, temperature and pressure will vary empirically with each composition of cover stock. It has been found that when castable polyurethane is used as the cover stock, the initial molding step is suitably about 5 to about 30 minutes, depending upon the mold temperature and the chemical composition of the cover stock, with enough pressure to keep the mold sealed during the initial molding step.

The intermediate curing step may also be determined empirically. It is typically about 0 minutes to about 4 hours at ambient temperature and pressure.

The initial molding time and the intermediate curing time can be kept to a minimum provided that a sufficient amount of the catalyst is added to the cover stock, the mold temperature is kept high, or the nature of the chemical reaction is fast.

While the length of time, temperature and pressure for the intermediate curing step may be determined empirically, it has been found that this can be calculated by using a rheometer to measure the shear resistance of the cover stock composition. The degree of cure can also be measured by a vibrating needle curemeter.

With polyurethanes, the degree of cure which has taken place is dependent upon, inter alia, the time, temperature, type of curative, and amount of catalyst used. It has been found that the degree of cure of the cover composition is directly proportional to the shear resistance or hardness of the composition. A shear resistance torque of about 50 to about 80 pounds per square inch (psi) for the cover stock at the end of the intermediate curing step (i.e. just prior to the final molding step) has been found to be suitable for the present invention. More preferred is about 60 to 70 psi.

This shear resistance torque measurement is suitably made with a Model R-900 rheometer made by Monsanto Co. or a similar device. The Model R-900 rheometer has two plates inside an insulated chamber. The chamber can be heated to the desired temperature. A suitable temperature is 195° F. (90.5° C). The plates rotate in opposite directions by 90°, thereby subjecting whatever material is between the two plates to a shear of 180°. A suitable technique for measuring the shear resistance of a cover stock is to divide a sample of the cover stock into a number of portions of sufficient size to fit between the plates of the rheometer. The portions are allowed to stand and cure under ambient conditions. The rheometer is set at 195° F. (90.5° C.) and, at periodic intervals, a portion of cover stock is placed between the plates and the torque is measured. When the torque of the cover stock has reached the desired range, e.g. about 50 to 80 psi, then the length of time for the intermediate curing step can be calculated by subtracting the length of time for the initial molding step from the total time calculated by this rheometer technique.

After the intermediate curing, the golf ball product is transferred to a compression mold where the final curing takes place. In this step, the golf ball product is subjected to heat and pressure to form dimples in its surface. If a fixed-pin mold was used in the initial molding step, then the final molding step closes the holes in the cover by subjecting the ball to enough heat and pressure to close the pinholes. This final curing time suitably takes about 1 to 5 minutes, with good results being obtained at about 2 minutes. The temperature is suitably about 150° F. (65.5° C.) to about 275° F. (135° C.), with good results being obtained at about 195° F. (90.5° C.) at about 1800 psi. The total final molding step, including preheating and cooling of the mold, takes approximately 8 minutes.

The dimpled golf ball product from the final molding step can be subjected to standard golf ball finishing operations such as buffing, painting, nameplating and packaging.

BRIEF DESCRIPTION OF THE DRAWINGS

These and other aspects of the present invention may be further understood with reference to the accompanying drawings in which.

DESCRIPTION OF THE PREFERRED EMBODIMENT

Figure 1:
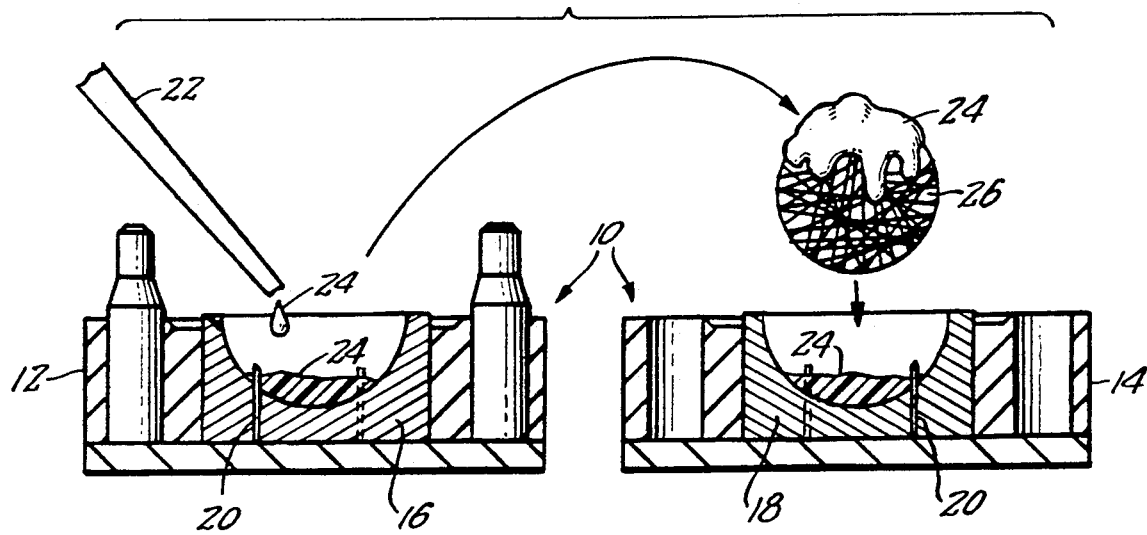
FIG. 1 illustrates a side view of a fixed-pin mold wherein the cover stock is introduced into an open mold.

FIG. 1 illustrates fixed-pin mold 10 with top plate 12 and bottom plate 14. In top plate 12 is smooth-walled mold cup half 16, and in bottom plate 14 is smooth-walled mold cup half 18. Both mold cups 16 and 18 are equipped with fixed pins 20. Nozzle 22 is used to introduce flowable cover stock 24 into both top and bottom mold cup halves 16 and 18. Wound core 26 is also shown partially covered by cover stock 24. Mold pins 20 hold core 26 in correct position, dead center, in top mold 16. Cover stock 24 partially cures while mold 10 is open.

Figure 2:
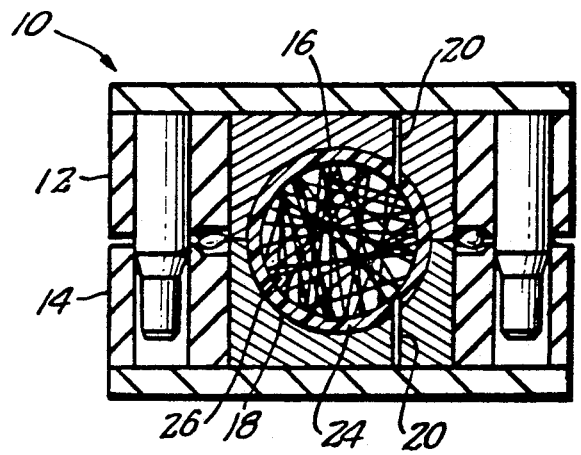
FIG. 2 illustrates a side view of the fixed-pin mold of FIG. 1 in a closed position.

FIG. 2 illustrates mold plates 12 and 14 joined after cover stock 24 has partially cured. The various parts of mold 10 are designated. The initial molding step is carried out at an elevated temperature of about 140° F. (60° C.) and mold plates 12 and 14 are subjected to just enough pressure to seal the mold plates and prevent seepage of cover stock material.

Mold 10 can also be a retractable-pin mold. The only difference is that pins 20 can be retracted out of the interior of mold cup halves 16 and 18.

Figure 3:
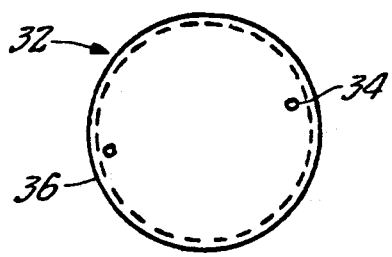
FIG. 3 illustrates a side view of a substantially smooth, round golf ball product.

FIG. 3 illustrates a smooth-surfaced golf ball product 32 from the initial molding step with a fixed-pin mold. Pinholes 34 are shown in the partially cured cover stock 36.

Figure 4:
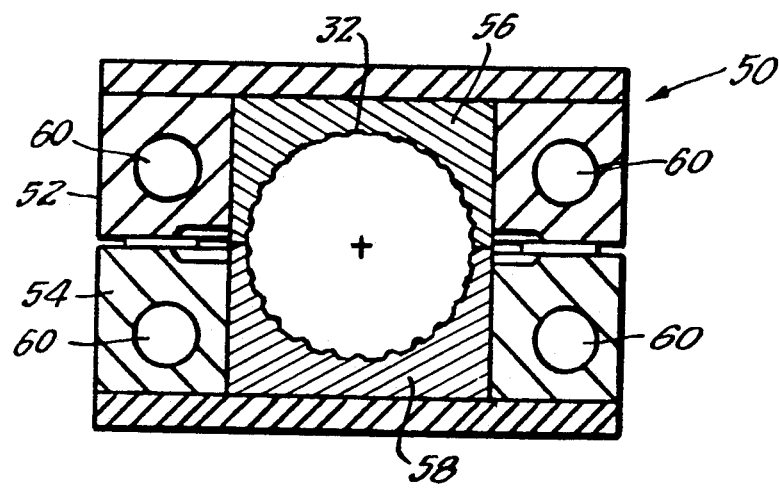
FIG. 4 illustrates a side view of a compression mold used for the compression molding step of the present invention.

FIG. 4 illustrates compression mold 50 with upper mold plate 52 and lower mold plate 54. Upper mold plate 52 has upper mold cup half 56 and lower mold plate 54 has lower mold cup half 58. Both mold cup halves 56 and 58 have negative dimple patterns therein. Conduits 60 run through both mold plates 52 and 54 such that a thermal medium, cooling or heating liquid/gas can be used to heat or cool mold plates 52 and 54.

Figure 5:
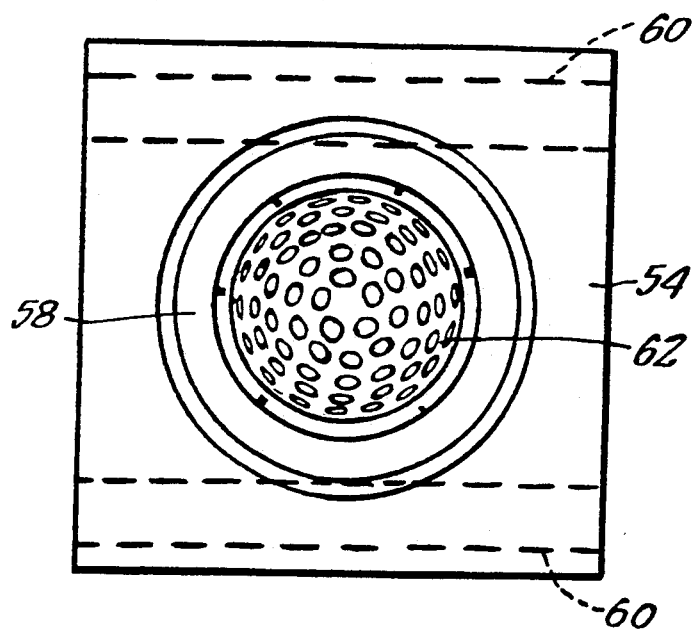
FIG. 5 illustrates a top view of the compression mold of FIG. 4 with half of the mold removed.

FIG. 5 is a top view of mold 50 with top mold plate 52 removed to show final golf ball product 62 with a dimple pattern on the cover.

These and other aspects of the present invention may be more fully understood with reference to the following examples.

EXAMPLE 1

This example illustrates making a polyurethane golf ball in accordance with the present invention.

First, a core was prepared by dipping a typical wound core in a PPG primer called S-24245 for 5 seconds. The core was then allowed to dry at ambient conditions for at least 2 hours.

Next, a flowable cover stock of polyurethane was prepared by mixing the ingredients shown in Table 1 below:

TABLE I

| Ingredients | Parts |
| --- | --- |
| 1. Polyurethane polycaprolactone prepolymer having an equivalent weight range of 341.0 to 346.5 g/mole. Product of Essex Specialty Products Inc. | 100 |
| 2. Curing agent, 1,4-butane diol, based on 95% of the theoretical amount of curing agent needed. Product of DuPont Co. | 12.44 |
| 3. Surfactants, DC-200, having a viscosity of 100 centistrokes. Product of Dow Corning Co. | 0.02 |
| 4. White Pigment, Harwick 10 PC03. Product of Harwick Co. | 3.94 |
| 5. Catalyst, DABCO 33LV Product of Linde Air Products Co. | 0.02 |

The amount of each ingredient is based on 100 parts by weight of polyurethane. Ingredients 1-4 above were mixed in a standard mixer at 66° C. for about 1 minute, after which time the catalyst was added and the mixing continued for 30 seconds.

Prior to mixing, a fixed-pin mold was prepared by using a mold release, PERMALEASE 2264, a commercial mold release obtained from George Mann & Co., Inc.

The fixed-pin mold was a standard mold containing mold cup halves that are smooth-walled and which, when closed, form a substantially smooth, round ball that is substantially similar in size and shape to a golf ball, except that no dimple pattern has been imparted onto the cover.

After mixing ceased, the 6.5 cc of cover stock was poured into each half cup of the fixed-pin mold and the cover stock was allowed to partially cure for 60 seconds. Then, the prepared core was placed into the top mold half and the mold was closed. The fixed-pin mold was at ambient temperature. The ball was kept in the first mold for 15 minutes at which time the ball was able to be handled without marring the surface or deforming the substantially smooth, round golf ball product. The smooth, round golf ball product of this first mold weighed about 45.5 grams and had a diameter of about 1.68 inches (4.25 cm). The product of this first mold was stored at ambient conditions in egg cartons.

From this first molding step, six balls were subjected to a compression molding step in which dimples were overmolded onto the substantially smooth, round golf ball product of the first mold. Of these six balls, three balls had an intermediate curing time of a ½ hour and three had an intermediate curing time of 3½ hours.

With the shorter intermediate curing time, ½ hour, the golf ball products of the first mold were subjected to a compression molding step wherein the compression mold was held at 195° F. (90.5° C.). The total cure time for the compression molding was 2 minutes. The first minute was at a low pressure of 100 psi, while the second minute was at a high pressure of 1800 psi.

With the longer intermediate curing time, 3½ hours, the balls were subjected to 2 minutes in the compression mold at a high pressure of 1800 psi and a temperature of 195° F. (90.5° C.) for the full 2 minutes.

Both longer and shorter intermediate curing times produced acceptable golf balls with a PGA compression of 104 measured using standard PGA compression testing techniques.

The balls produced in this example had the appearance of high-quality golf balls with virtually no surface defects.

EXAMPLE 2

This example illustrates making a polyurethane golf ball in accordance with the present invention using a different cover stock than that of Example 1.

A wound core was prepared in accordance with Example 1 above.

A cover stock was prepared with the formulation shown in Table II below:

TABLE II

| Ingredients | Parts |
| --- | --- |
| 1. Polyurethane, polyether prepolymer having an equivalent weight in the range of 376 to 383 g/mole. Product of Essex Specialty Products Inc. | 100 |
| 2. Curing agent, 1,4-butane diol, based on 95% of the theoretical amount of curing agent needed. Product of DuPont Co. | 11.26 |
| 3. Surfactants, DC-200, with a viscosity of 100 centistrokes. Product of Dow Corning Co. | 0.02 |
| 4. White Pigment, Harwick 10 PC03. Product of Harwick Co. | 3.89 |
| 5. Catalyst DABCO-33LV. Product of Linde Air Products Co. | 0.02 |

The amount of each component above added to the mixture is based on 100 parts of polyurethane. Components 1-4 were mixed in a standard mixer for 1 minute at 66° C. Then the catalyst was added and mixing was continued for 30 seconds.

A pin mold was prepared in accordance with Example 1 above and golf balls were molded following the procedures laid out in Example 1. The smooth ball products weighed about 45.5 grams and were about 1.68 inches (4.25 cm) in diameter. Balls were cured using both the shorter and longer intermediate curing times. The final balls had a PGA compression of 92.7 tested in accordance with Example 1.

The balls produced in this example had the appearance of high-quality golf balls with virtually no surface defects.

EXAMPLE 3

This example illustrates making a polyurethane golf ball in accordance with the present invention using a different formulation, core and mold temperature than that of Examples 1 and 2.

A solid core was surface roughened but not dipped in a primer.

A cover stock was prepared with the formulation shown in Table III below:

TABLE III

| Ingredients | Parts |
| --- | --- |
| 1. Polyurethane polyether prepolymer having an equivalent weight range of 395 to 380 g/mole. Product of Essex Specialty Products Inc. | 100 |
| 2. Curing agent, 1,4-butane diol, based on 95% of the theoretical amount of curing agent needed. Product of DuPont Co. | 11.03 |
| 3. Surfactants, DC-200, having a viscosity of 100 centistrokes. Product of Dow Corning Co. | 0.02 |
| 4. White Pigment, TENKOR 92759 UF. Product of Teknor Color Co. | 3.89 |
| 5. Catalyst DABCO 33LV Product of Linde Air Products Co. | 0.04 |

The amount of each component above added to the mixture is based on 100 parts of polyurethane. Components 1-4 were mixed in a standard mixer for 1 minute at 66° C. Then the catalyst was added and mixing was continued for 20 seconds.

A 140° F. (60° C.) pin mold was prepared in accordance with Example 1 above and golf balls were molded following the procedures laid out in Example 1. The smooth ball products weighed about 45.5 grams and were about 1.68 inches (4.25 cm) in diameter. Balls molded from this first molding step were immediately subjected to a compression molding step in which dimples were overmolded onto the substantially smooth, round golf ball product of the first mold.

The smooth, round golf ball products of the first mold were subjected to a compression molding step wherein the compression mold was held at 235° F. (113° C.) at 1800 psi. The total curing time for the compression molding was 2 minutes.

The balls produced in this example had the appearance of high-quality golf balls with virtually no surface defects.

The cover of the present invention can be used for both wound golf balls, i.e. golf balls having a wound core, and multiple pieced golf balls, e.g. two-piece golf balls having a solid core and a cover.

It will be understood that each and every numerical value which appears in the claims herein is modified by the term "about" if the modifying term "about" does not appear in front of such numerical value.

It will be understood that the claims are intended to cover all changes and modifications of the preferred embodiments of the invention herein chosen for the purpose of illustration which do not constitute a departure from the spirit and scope of the invention.

What is claimed is:

1. A method for making a polyurethane covered golf ball comprising the steps of:
    (a) initially curing polyurethane cover stock in both a top mold half and a bottom mold half of an open, smooth-walled mold for a sufficient period of time so that a core positioned in the top mold half does not fall out of said mold during closing of the mold;
    (b) initially molding, in the smooth-walled mold, the polyurethane cover stock about the core for a sufficient period of time to form a smooth-surfaced golf ball product that can be removed from the smooth-walled mold without being deformed;
    (c) intermediately curing the smooth-surfaced golf ball product for a sufficient period of time so that the polyurethane cover stock molded about the core is able to retain a dimple pattern of a compression mold; and
    (d) compression molding said intermediately cured, smooth-surfaced golf ball product for a sufficient period of time to form a dimpled golf ball.

2. The method of claim 1 wherein said smooth-walled mold is a fixed-pin mold.

3. The method of claim 1 wherein said smooth-walled mold is a retractable-pin mold.

4. The method of claim 1 wherein the period of time for initial curing of the polyurethane cover stock is about 1 minute.

5. The method of claim 4 wherein the period of time sufficient for initially molding the polyurethane cover stock is between about 5 and about 30 minutes.

6. The method of claim 5 wherein the period of time sufficient for compression molding the intermediately cured, smooth-surfaced golf ball product in the compression mold is from about 1 to about 5 minutes.

7. The method of claim 1 wherein the period of time sufficient for initially molding the polyurethane cover stock is between about 5 and about 30 minutes.

8. The method of claim 1 wherein the period of time sufficient for compression molding the intermediately cured, smooth-surfaced golf ball product in the compression mold is from about 1 to about 5 minutes.

9. The method of claim 1 wherein the polyurethane cover stock has a viscosity at the end of the initial curing step which is twice the viscosity at the beginning of the initial curing step.

10. The method of claim 9 wherein the polyurethane cover stock at the end of the intermediate curing step has a shear resistance of about 50 to about 80 psi.

11. The method of claim 1 wherein the polyurethane cover stock at the end of the intermediate curing step has a shear resistance of about 50 to about 80 psi.

12. The method of claim 1 wherein the compression molding is conducted at a temperature of about 150° to about 275° F. and a pressure of about 1800 psi.

13. A method for making a polyurethane covered golf ball comprising the steps of:
    (a) initially curing polyurethane cover stock in both a top mold half and a bottom mold half of an open, smooth-walled mold for a sufficient period of time so that a core positioned in the top mold half does not fall out of said mold during closing of the mold;
    (b) forming a smooth-surfaced golf ball product by closing said smooth-walled mold such that the polyurethane cover stock flows around the core;
    (c) curing the smooth-surfaced golf ball product for a sufficient period of time such that the smooth-surfaced golf ball product can be removed from the smooth-walled mold without being deformed and such that the smooth-surfaced golf ball product is able to conform to and retain a dimple pattern in a compression mold; and
    (d) compression molding the smooth-surfaced golf ball product for a sufficient period of time to form a dimpled golf ball.

14. The method of claim 13 wherein the period of time for initial curing of the polyurethane cover stock is about 1 minute.

15. The method of claim 13 wherein the period of time sufficient for compression molding the intermediately cured, smooth-surfaced golf ball product in the compression mold is from about 1 to about 5 minutes.

16. The method of claim 13 wherein the polyurethane cover stock prior to compression molding has a shear resistance between about 50 to about 80 psi.

17. The method of claim 13 wherein the during step (c) comprises:
    ($c_1$) initially molding a smooth-surfaced golf ball product in the smooth-walled mold for a sufficient period of time such that the smooth-surfaced golf ball product can be removed from the smooth-walled mold without being deformed;
    ($c_2$) removing the smooth-surfaced golf ball product from the smooth-walled mold; and
    ($c_3$) intermediately curing the smooth-surfaced golf ball product for a sufficient period of time such that the smooth-surfaced golf ball product is able to conform to and retain the dimple pattern of the compression mold.

18. The method of claim 17 wherein the period of time for initial curing of the polyurethane cover stock is about 1 minute.

19. The method of claim 17 wherein the period of time sufficient for initally molding the polyurethane cover stock is between about 5 and about 30 minutes.

20. The method of claim 17 wherein the period of time sufficient for compression molding the intermediately cured, smooth-surfaced golf ball product in the compression mold is from about 1 to about 5 minutes.

21. The method of claim 17 wherein the polyurethane cover stock at the end of the intermediate curing step has a shear resistance of about 50 to about 80 psi.

* * * * *

UNITED STATES PATENT AND TRADEMARK OFFICE
CERTIFICATE OF CORRECTION

PATENT NO. : 5,006,297
DATED : April 9, 1991
INVENTOR(S) : Robert A. Brown and Shenshen Wu It is certified that error appears in the above-identified patent and that said Letters Patent is hereby corrected as shown below:

Title Page, item [57]:
Abstract, line 10, change "is" to --in--.

Column 4, line 21, after "ball" insert --is--.

Column 6, line 18, indent two spaces to show that "FIG. 5" is the beginning of a new paragraph.

Column 8, item 4 of Table III, change "TEWKOR" to --TEKNOR--.

Column 10, line 33, change "to" to --and--.

Column 10, line 34, change "during" to --curing--.

Column 10, line 52, change "initally" to --initially--.

Signed and Sealed this

Twenty-second Day of September, 1992

Attest:

DOUGLAS B. COMER

Attesting Officer

Acting Commissioner of Patents and Trademarks